July 22, 1941.   J. N. WHITE   2,250,286
HOSE COUPLING
Filed Sept. 27, 1937

INVENTOR
JOHNATHAN N. WHITE
BY
Moses & Nolte
ATTORNEYS

Patented July 22, 1941

2,250,286

UNITED STATES PATENT OFFICE 2,250,286

HOSE COUPLING

Jonathan N. White, Larchmont, N. Y., assignor to United Metal Hose Company, Inc., Long Island City, N. Y., a corporation of New York Application September 27, 1937, Serial No. 165,818

2 Claims. (Cl. 285—84)

This invention relates to hose couplings and more particularly to couplings for use with flexible hoses having depressible walls of any compound, such as fabric, rubber, or a combination of the two, and either with or without a metallic reinforcement or lining.

Various types of hose couplings previously known are so designed that they will long outlast in usefulness the life of the hose proper. Accordingly, when the hose wears out, the coupling member must be detached therefrom and applied to a new hose since the cost of the coupling is too great to justify its discard after relatively short use. This very often necessitates the return of the old hose with the coupling to the hose manufacturer and the consequent expense and waste of time.

This disadvantage and inconvenience may be overcome by provision of a coupling which, while it makes a tight connection and is sufficiently strong to withstand rough use, is nevertheless sufficiently inexpensive so that it may be discarded when the hose wears out, and a new unit of hose and coupling be provided at substantially the cost of applying the old coupling to the new hose.

These features have application wherever hoses and couplings therefor are used. One example of particularly advantageous application is in the field of fuel pumps where the dispensing hose receives particularly rough treatment and must be frequently replaced.

It is an object of this invention to provide a hose coupling which may be applied by machine or hand and which will be sufficiently inexpensive to make it economically possible to discard the coupling with the hose when the hose wears out and replace the worn part with an entire new unit.

It is another object of this invention to provide a coupling member which is adapted to engage and hold the end of the hose without injury to the material thereof, but which shall make an entirely liquid and gas tight contact between the hose and the coupling.

It is a further object of this invention to provide a hose coupling in which the hose is inserted between two circular sleeves which preferably present smooth, unthreaded and unserrated surfaces to the portion of base engaged, the outer sleeve having a protuberance thereon in which is contained a metallic split ring, the engagement of the hose with the coupling member being accomplished by the depression of this outer protuberance which presses the split ring against the material of the hose and thereby holds it firmly between the two sleeves.

Hose couplings have been proposed embodying a double sleeve construction and the insertion of the end of the hose between the two sleeves, but in these previously proposed constructions either the inner surface of the outer sleeve or the outer surface of the inner sleeve has been serrated or threaded, and the grasp of the hose accomplished by means of pressing these serrations or threads against the hose. These serrations or threads tend to break the inner or outer surface of the hose and thus reduce its useful life.

In the drawing which forms a part of the specification and illustrates one preferred embodiment thereof, Fig. 1 is a view of the hose inserted in the coupling member but before final attachment, partly in side elevation and partly in longitudinal section;

Figure 1:
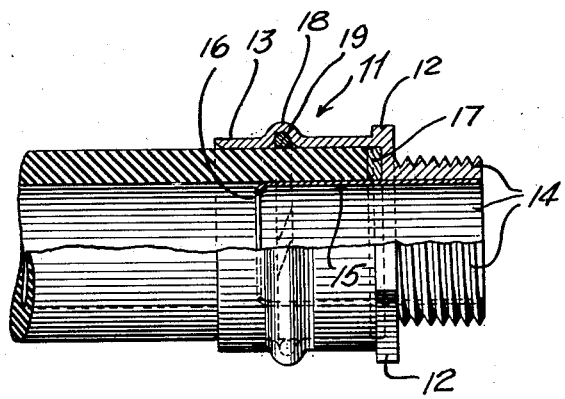

In pursuance of the objects of the invention a sleeve 11, the inner diameter of which is equal to or slightly in excess of the outside diameter of the hose, is provided, having a collar 12 at one end thereof and preferably a slightly outwardly flanged portion 13 at the other. The collar 12 extends inwardly until its diameter is substantially equal to the inner diameter of the hose to which the coupling is to be applied. Attached to or formed as a part of the collar on the side away from the sleeve 11 is a threaded portion 14. This connecting portion may be in any convenient form to suit the needs of the application or use made of the coupling.

Within the collar 12 and the connecting means 14 is located an inner sleeve 15. This sleeve has an outside diameter approximately equal to the inside diameter of the hose to which the coupling is to be applied. To facilitate the insertion of the hose between the two sleeves and to prevent cutting of the hose, the outer circumferential edge of the inner sleeve 15 is preferably slightly turned in, as shown at 16. The inner surface of the sleeve 11 and the outer surface of the sleeve 15 are preferably of smooth non-threaded and non-serrated construction which avoids any injury to the part of the hose engaged by the coupling.

Against the portion of the collar 12 which lies between the two sleeves 11 and 15 is preferably inserted a washer 17 which may be of rubber and which serves to minimize any unevenness at the end of the hose and assists in making the joint between the hose and the coupling member liquid and gas tight.

The outer sleeve 11 has a protuberance or hollow rib 18 which encircles the sleeve. Within the protuberance 18 is contained a split ring 19 which is preferably of metal and smooth surfaced. As illustrated, it may desirably be of substantially round cross section. The protuberance 18 is preferably located at a point on the outer sleeve 11 inwardly spaced from the end of the sleeve. Considerable support is afforded to the hose by the portion of the sleeve beyond the protuberance, and it is not possible to bend the hose directly at the point at which it is grasped by the ring, which would tend to cause the ring to cut into the hose and weaken the same.

The method of making the connection between the hose and the coupling member is simple. The coupling member, as previously stated, is so designed that the hose can be inserted between the two sleeves and the end of the hose abuts the washer 17. The split ring is placed inside the protuberance before the coupling is applied.

Figure 2:
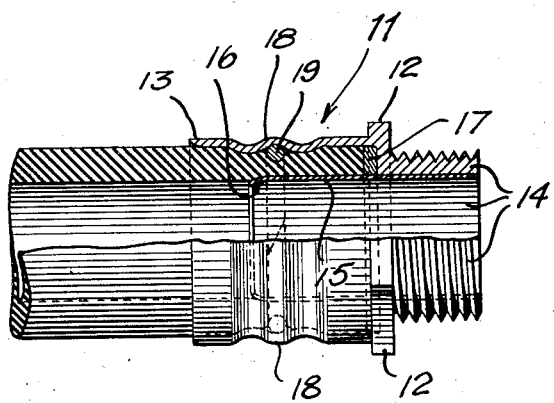
Fig. 2 is a view similar to Fig. 1 with the attachment between the hose and the coupling member accomplished.

When the hose has been placed in this position the protuberance is depressed or more or less flattened out by means of a crimping machine or by other convenient means. When the crimping is completed, the coupling appears as shown in Fig. 2. The split ring has pushed the part of the hose it engages tightly against the inner sleeve and has itself been depressed into the outside of the hose. The depression of the protuberance is preferably so performed as to produce depressions at each side thereof which form a pair of circumferential indentations which retain the split ring in place and simultaneously aid in gripping the hose against the inner sleeve, thus enhancing the tightness of the coupling. The parts of the outer sleeve and the indentations at each side of the split ring firmly support the material of the hose in engagement with the ring. Furthermore, the depression of the ring tends to lessen the volume of the space between the ring and the shoulder 12 and by confining the material of the hose, forces it between the sleeves and against the shoulder, thus enhancing the tightness of the coupling and enabling it to resist high pressure without blowing off from the hose. Since the ring is smooth, and preferably completely round, having no sharp edges, no creasing or cutting of the hose occurs at the point of engagement and useful life of the coupling and the hose as a unit is accordingly lengthened.

An additional advantage of the construction of this invention is the fact that the hose is preferably gripped on the outside surface only, and thus any damage caused by deformity or strain on the inner tube is obviated. This is of importance, since where strain is placed on the inside surface of the hose any failure that does occur will result in the inner surface of the hose sloughing off and being carried with the material delivered in the hose, which, in the case of use in gasoline pumps, would result in these small particles of rubber and the like being carried into delicate and moving parts of internal combustion machines. Where the hose is not gripped on its inside surface, such a condition cannot arise.

Figure 3:
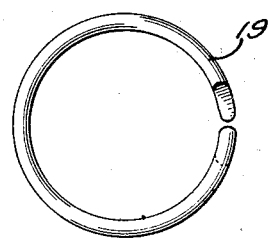
Fig. 3 is a plan view of the split ring used in the coupling.

In order that the split ring shall completely encircle and engage the hose in the position shown in Fig. 2, the ends of the ring are preferably beveled and overlapped as shown in Fig. 3, so that when the ring grips the hose, the two beveled ends will overlap and thus no part of the hose will be out of engagement. It is preferable that the compressed ring have its diameter slightly larger than the diameter of the inner sleeve so that the ring will be firmly embedded in the hose, thus insuring a tight engagement.

While I have illustrated and described in detail certain preferred forms of my invention, it is to be understood that changes may be made therein and the invention embodied in other structures. I do not, therefore, desire to limit myself to the specific construction illustrated, but intend to cover my invention broadly in whatever form its principle may be utilized.

I claim:

1. A coupling member for attachment to a hose, including a first sleeve adapted to be inserted in the hose and a second sleeve adapted to encircle the end of a hose, said second sleeve having a rounded annular protuberant portion extending around the sleeve between the ends thereof and projecting radially outward beyond the adjoining portions of the sleeve at each side thereof, said protuberant portion having an internal annular recess therein and a split ring of rounded cross section in said recess, the inner diameter of said split ring lying substantially in alignment with the inner surfaces of the second sleeve at each side of said recess.

2. In a hose coupling in combination, a flexible hose and a coupling member therefor including a first sleeve inserted in the hose and a second sleeve encircling the end of the hose, said second sleeve being formed of malleable metal of substantially uniform thickness and having an annular protuberant portion extending around the sleeve between the ends thereof and forming an annular recess on the inside of said sleeve, a split ring of rounded cross section in said annular recess, said protuberant portion and said ring being deformed to reduce the diameter thereof to force said ring into gripping engagement with said hose.

JONATHAN N. WHITE.